April 8, 1924.  
S. E. LANE  
FISHING CREEL  
Filed May 4, 1921  
1,489,255  
2 Sheets-Sheet 1

Inventor  
Sherman E. Lane  
By Lancaster and Allwine  
Attorneys

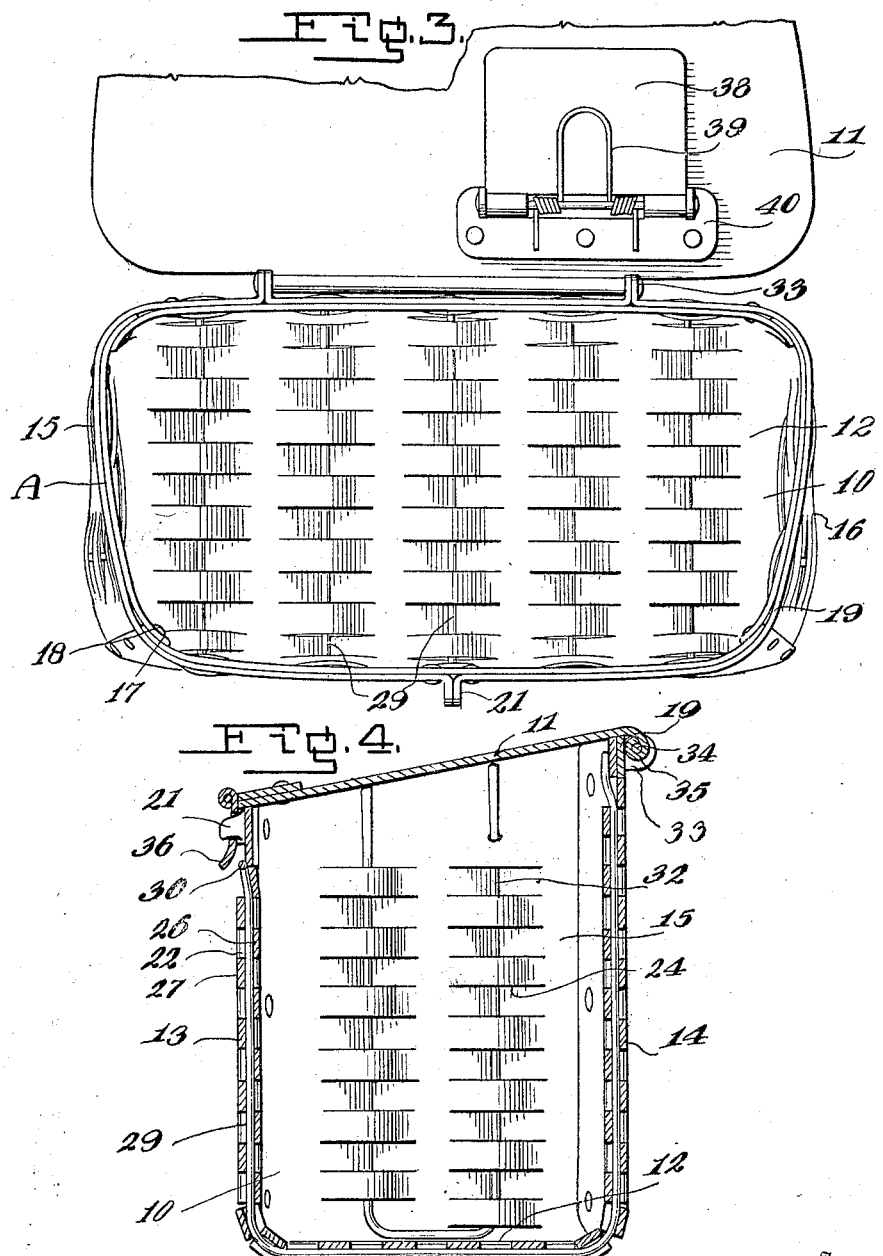

Patented Apr. 8, 1924.

1,489,255

UNITED STATES PATENT OFFICE.

SHERMAN E. LANE, OF CANON CITY, COLORADO.

FISHING CREEL.

Application filed May 4, 1921. Serial No. 466,811.

*To all whom it may concern:*

Be it known that I, SHERMAN E. LANE, a citizen of the United States, residing at Canon City, in the county of Fremont and State of Colorado, have invented certain new and useful Improvements in Fishing Creels, of which the following is a specification.

This invention relates to baskets of the type used for fishing, and the primary objects are first to provide a fishing creel, which can be easily cleaned and kept in a sanitary condition; second, to provide a fishing creel which can be boiled in a suitable disinfecting or cleansing fluid without deterioration; and third, to provide a fishing creel of strong construction and exceedingly light weight.

Another object of the invention is to provide a fishing creel of the above character, which will be durable and efficient in use, and one that can be placed upon the market at a reasonable cost.

A further object of the invention is to provide a receptacle composed wholly of a rust resisting metal suitably strengthened and fabricated to provide a thorough ventilation therethrough.

With these and other objects in view, the invention consists in the novel construction, arrangement and formation of parts, as will be hereinafter more specifically described, claimed and illustrated in the accompanying drawings, forming a part of this specification, in which drawings:

Figure 3 is a top plan view of the improved creel, showing the lid or cover thereof in a raised or opened position.

Figure 4 is a vertical transverse section through the improved creel, with the lid in its closed position.

Figure 1:
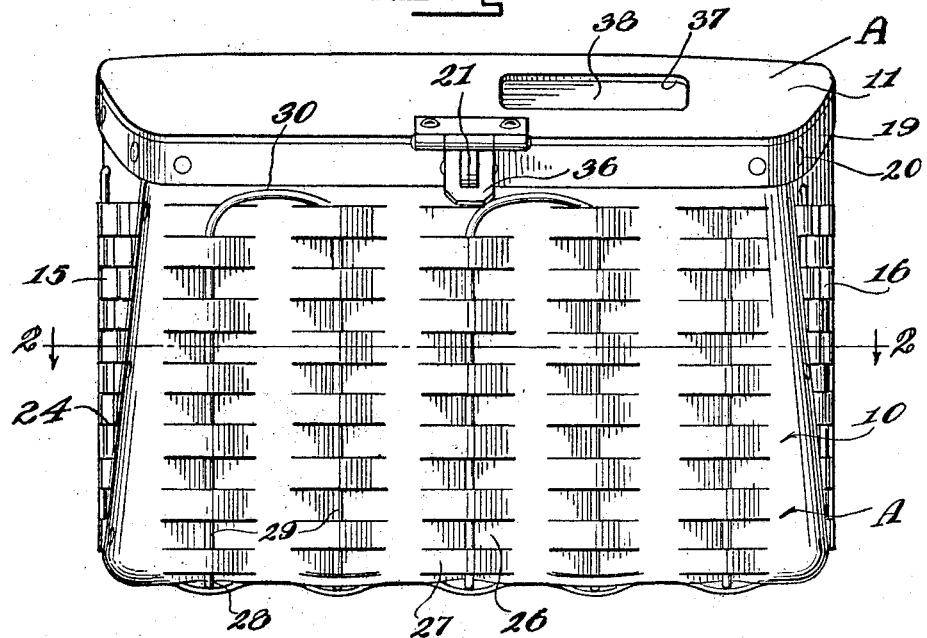
Figure 1 is a side elevation of the improved fishing creel.
Figure 2:
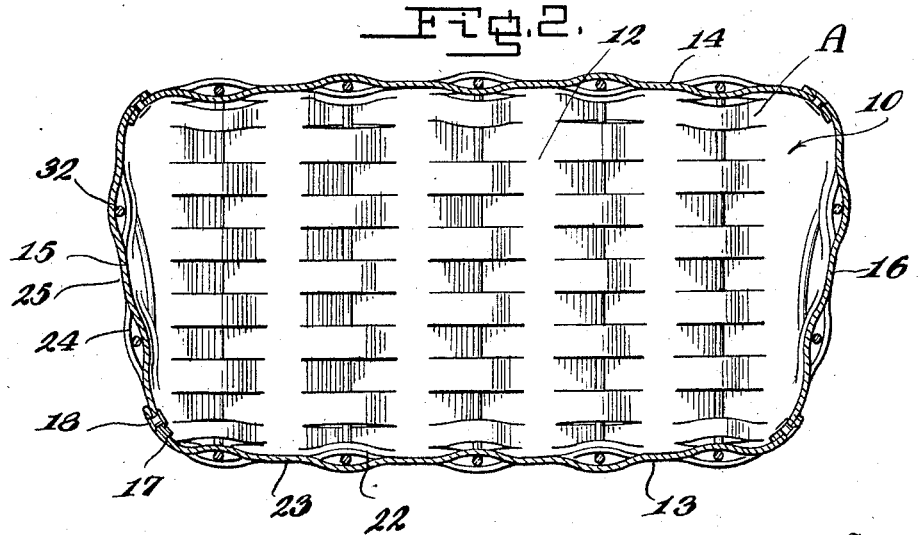
Figure 2 is a horizontal section through the same, taken on the line 2—2 of Figure 1.

Referring to the drawings in detail, wherein similar reference characters designate corresponding parts throughout the views, the letter A indicates the fishing creel preferably formed of sheet metal and bent into the desired form and includes the body portion 10 and the cover 11.

The body 10 includes a bottom wall 12, the upturned front and rear walls 13 and 14, and the end walls 15 and 16. These walls 13, 14, 15 and 16 are bent upwardly from the marginal edges of the bottom wall 12 and have their meeting edges provided with overlapping flanges 17, which can be secured together in any preferred manner. As shown the overlapping flanges 17 are riveted together as at 18.

A reinforcing band 19 is provided for the upper end of the body portion of the basket, and is bent around the same and secured in place by suitable fastening elements, such as rivets 20.

The terminals of this reinforcing band 19 terminates at the forward end of the basket at the transverse end thereof, and are bent outwardly to provide ears 21, which form a portion of the fastener or retaining member for the cover 11, which will be hereinafter more fully described. The front wall 13, the rear wall 14, and the bottom wall 12 are provided with rows of transversely aligned longitudinally extending slits 22, defining imperforate strips 23 therebetween. The end walls 15 and 16 are also provided with longitudinally aligned rows of transversely extending slits 24, which define therebetween imperforate strips 25. The portions of the body lying between each pair of the slits 22 and 24 are alternately struck inwardly and outwardly as at 26 and 27 similar to the weave of a split basket, and these slits provide suitable ventilating openings in the creel, and permit moisture or liquid to readily drain from the creel. In order to reinforce the creel, suitable reinforcing wires or rods 28 are utilized. These rods or wires 28 consist of parallel strands 29, which are placed between the struck in and out portions 26 and 27 of the body portion of the creel, and the strands of wires 29 can be connected at the front of the body by bight portions 30. The ends of the strands 29 at the rear end of the body, are inserted on the inside of the basket and can be riveted or mashed in position. The side walls 15 and 16 are also reinforced by vertical strands of wire or rods 32, which are disposed intermediate the struck in and out tongues formed in the side walls.

The upper reinforcing band 19, has the portion which extends around the rear wall 14 provided with outwardly extending ears 33, which form the supports for the pintle 34 of the cover 11, which will now be described.

The cover 11 is preferably formed of a single sheet of metal and is shaped to conform to the configuration of the creel, and is adapted to engage the upper edges of the body portion of the creel. The rear edge of the cover is provided with a rolled hinge barrel 35, which receives the hinged pin or pintle 34. The forward edge of the cover 11 carries a suitable pivoted latch or keeper 36 for receiving the ears 21 formed on the front portion of the band 19.

The cover 11 may be provided with a suitable opening 37 for facilitating the placing of fish within the creel, and this opening may be provided with a hinged door 38, which can be normally held in closed position by means of a suitable spring 39.

As shown the door 38 is pivoted to a suitable bracket 40, riveted or otherwise secured to the inner surface of the cover 11.

It is to be understood that the creel may have secured thereto in any preferred manner a suitable shoulder strap.

As stated, the fishing creel is adapted to be formed wholly of metal, preferably non-rusting material, such as aluminum or the like.

By forming the creel wholly out of metal, the same can be readily cleaned with a brush or boiled in a suitable cleansing compound and thus kept in a sanitary condition and eliminate the difficulties heretobefore experienced with the ordinary willow creels now on the market, which soon become unfit for use. If the willow creels are scoured or boiled, they soon become weakened and rapidly fall apart.

Changes in details may be made without departing from the spirit or scope of the invention; but,

I claim:

1. A fishing creel comprising a metallic body having a plurality of spaced rows of slits formed therein, portions of the metal between said slits being alternately struck in and out to provide offset tongues, reinforcing rods threaded between the struck in and out tongues, the rods extending from the front wall to the rear wall, and under the lower wall.

2. A fishing creel comprising a body formed of sheet metal including a bottom wall, upturned front, rear and side walls formed on the bottom wall, the meeting edges of the front, rear and end walls being provided with over lapping flanges, means for securing the flanges together, a metallic cover for the body, the body having alternately struck in and out tongues formed therein, and reinforcing wires threaded between said tongues.

3. A fishing creel formed of metal including a sheet metal body formed of a single sheet of material including a bottom wall, upstanding front, rear and end walls formed on the bottom wall, the side edges of the front, rear and bottom wall having overlapping flanges, means securing the flanges together, the body having a plurality of spaced ventilating slits formed therein, a band secured to and surrounding the upper end of said basket, pivot ears formed on the band at the rear end of said creel, outstanding ears formed on the front end of the band at the front end of the creel, a metallic cover, means securing the cover to the pivot ears formed on the band at the rear end of the creel, and a hinged keeper carried by the cover arranged to engage the ears formed on the band at the front end of the creel.

4. A fishing creel comprising a body having spaced slits formed therein, alternately struck in and out tongues between said slits, reinforcing wires threaded between the tongues and extending from the front wall under the lower wall, and to the rear wall.

SHERMAN E. LANE.